L. H. MILLER.
INTERLOCKING DEVICE FOR GAS MACHINES.
APPLICATION FILED MAY 5, 1908.
923,063.
Patented May 25, 1909.
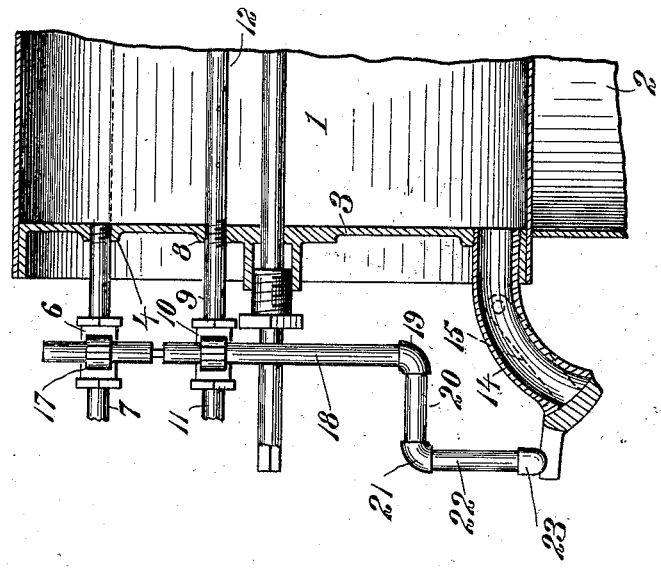
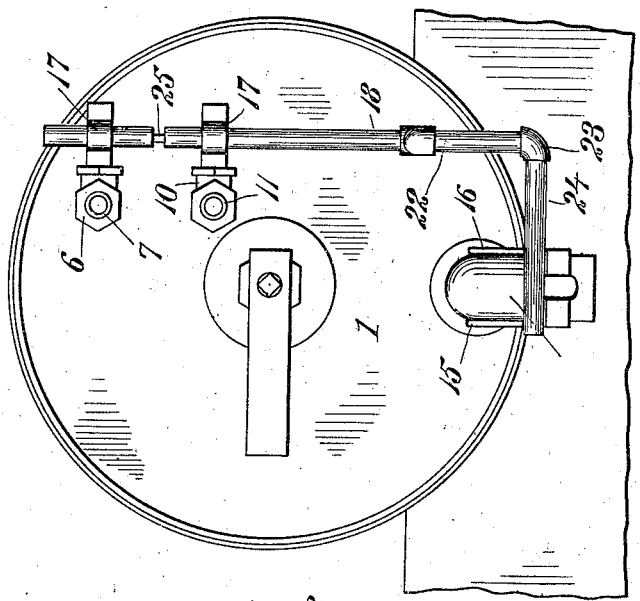
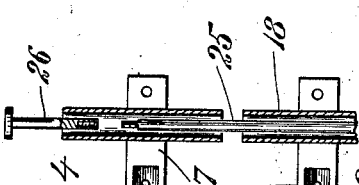
Witnesses
Inventor
Louis H. Miller
by Medina & Griffin
Attorneys

UNITED STATES PATENT OFFICE.

LOUIS H. MILLER, OF MOUNT EDEN, CALIFORNIA.

INTERLOCKING DEVICE FOR GAS-MACHINES.

No. 923,063.    Specification of Letters Patent.    Patented May 25, 1909.

Original application filed April 15, 1907, Serial No. 368,130. Divided and this application filed May 5, 1908. Serial No. 430,990.

*To all whom it may concern:*

Be it known that I, LOUIS H. MILLER, a citizen of the United States, residing at Mount Eden, in the county of Alameda and State of California, have invented a new and useful Interlocking Device for Gas-Machines, of which the following is a specification in such full and clear terms as will enable those skilled in the art to construct and use the same.

This invention relates to an interlocking device for gas machines, and its object is to protect such machines from being tampered with by persons who are unauthorized to open the valves thereof, this application being a division of application Serial Number 368,130 filed Apr. 15, 1907.

Another object of the device is to provide an interlocking device which shall lock three of the valves of such with one operation, and which shall be as simple as possible requiring no complex or machined parts other than those which can be made in any ordinary machine shop.

In the drawings, in which the same numerals of reference are applied to the same parts throughout, Figure 1 is an end view of a gas generator with the interlocking device attached, Fig. 2 is a sectional view of a portion of the generator showing the interlocking device, Fig. 3 is a plan of one of the clamps used for securing the hollow handles to the plug of the service cocks, and Fig. 4 is a vertical sectional view of the interlocking handles.

The numeral 1 is applied to the generator, a portion of the gas machine showing at 2. The generator is provided with the head 3 which has a number of bosses in which are secured the various pipes of the system.

The boss 4 has the nipple screwed into it to which the service cock 6 is connected and into which latter the pipe 7 is threaded. In the boss 8 is screwed the nipple 9 and on this is the service cock 10, the pipe 11 from the water main being screwed into the latter. This pipe leads to the spray pipe 12 which is used for the purpose of washing down the generator. At the bottom of the generator there is another boss in which is screwed the swing gate valve 14, the gate of said valve being hinged by means of the straps 15 and 16 which are pivoted thereto near the upper part of the valve.

Secured to the plug of each service cock by means of the clamps 17 is a tubular handle 18, the lower one being the longer, and having an elbow 19, a short pipe 20, an elbow 21, a second short pipe 22, an elbow 23 and a short pipe 24 secured thereto as illustrated. Now it will be apparent that as the service cocks are in the same vertical planes that their handles will be vertically in line and that it will be possible to lock the two service cocks in a given position by means of the rod 25 which is dropped down into the pipes forming the handles of the service cocks, but since the pipes and elbows secured to the lower pipe 18 are so placed as to extend over the top of the handle of the gate valve 14, it will be noted that it is locked as well. The rod 25 is threaded on both ends so that it can be taken out of the pipes 18, no matter which end happens to be up, by means of the threaded key 26, and since the rod is shorter than the combined length of the two hollow handles it cannot be taken out without the key.

When the generator is to be washed out the rod 25 is taken out of the tubes 18 and the gate valve is opened, the service cocks are then opened, one to allow the air to have access to the generator and the other to allow the wash water to spray over the inside of the generator. After the generator has been washed out the gate valve 14 is closed, the generator is then filled with water to the upper service cock, which is left open till the water begins to run out, then all the valves are closed and the rod 25 is replaced in the tubes 18 and the machine is ready for use and insured against having its valves opened by persons who have no business therewith.

Having thus described my invention what I claim as new and desire to secure by Letters Patent of the United States is as follows:

1. In an interlocking device for gas machines, the combination of a gas generator, a pair of valves for said generator in the same vertical planes, hollow handles for opening said valves, a wash out valve at the bottom of the generator, means to open the valve, a rod adapted to be passed into the hollow handles of the first two valves and means extending from the handle of the lower valve for securing the washout valve in its closed position.

2. In an interlocking device for gas machines, the combination with a gas generator, a pair of valves having alined hollow handles, a wash out valve having a swing gate, a rod, adapted to be passed into the hollow handles and means extending from the lower of said handles for securing the gate valve in its closed position.

3. In an interlocking device for gas machines, the combination with a gas generator, of a pair of vertically alined valves, hollow vertically alined handles for opening said valves, a washout valve at the bottom of the generator, a vertically swinging gate for said valve, means extending from the lower hollow handle over the top of the gate valve handle, and a rod adapted to be passed down into the hollow handles to secure them in a given position.

4. In an interlocking device for gas machines, the combination of a gas generator, a pair of vertically alined valves for said generator each of said valves having a vertically alined hollow handle the handle of the upper valve having its lower end in close proximity to the top of the lower hollow handle, a washout valve at the bottom of the generator, a vertically swinging gate valve for said generator, means extending from the lower handle over the handle of the gate valve, and a rod shorter than the depth of the two hollow handles for securing them in a given position.

In testimony whereof I have set my hand this 24th day of April A. D. 1908, in the presence of the two subscribed witnesses.

LOUIS H. MILLER.

Witnesses:
 W. T. Hess,
 C. P. Griffin.